United States Patent [19]

Johnson

[11] Patent Number: 4,908,954
[45] Date of Patent: Mar. 20, 1990

[54] MEASURING TAPE GUIDE AND FINGER GUARD

[76] Inventor: Gene A. Johnson, 500 Clover St., Fairborn, Ohio 45324

[21] Appl. No.: 182,107

[22] Filed: Apr. 15, 1988

[51] Int. Cl.⁴ ............................................. G01B 5/02
[52] U.S. Cl. ........................................ 33/768; 33/42
[58] Field of Search .................. 33/138, 139, 140, 42, 33/759, 760, 768, 770

[56] References Cited

U.S. PATENT DOCUMENTS

| | | | |
|---|---|---|---|
| 2,807,886 | 10/1957 | Aciego | 33/138 X |
| 3,192,630 | 7/1965 | Dineson | 33/42 |
| 3,774,309 | 11/1973 | Leopoldi | 33/138 |

Primary Examiner—Harry N. Haroian
Attorney, Agent, or Firm—Roger S. Dybvig

[57] ABSTRACT

A lip-like tape guide and finger guard plate extends downwardly from the front edge of the bottom wall of a thin-walled, one-piece plastic body that forms a jacket for slidably receiving a measuring tape.

14 Claims, 2 Drawing Sheets

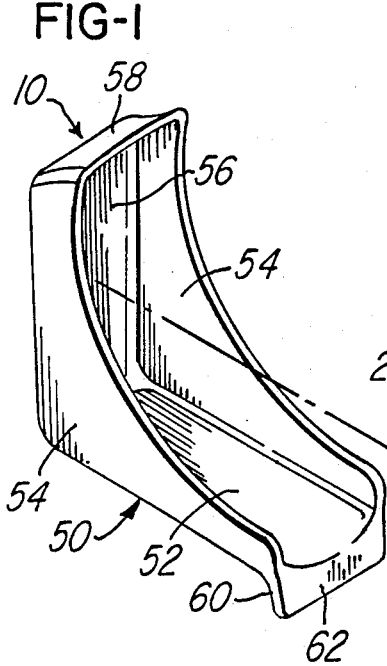
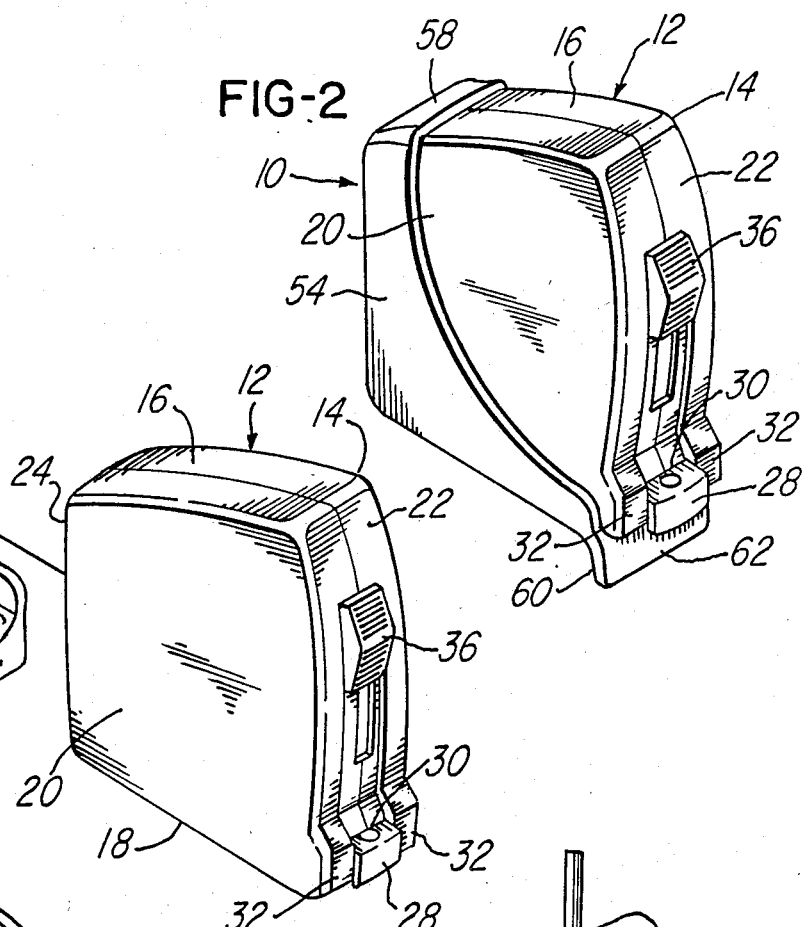
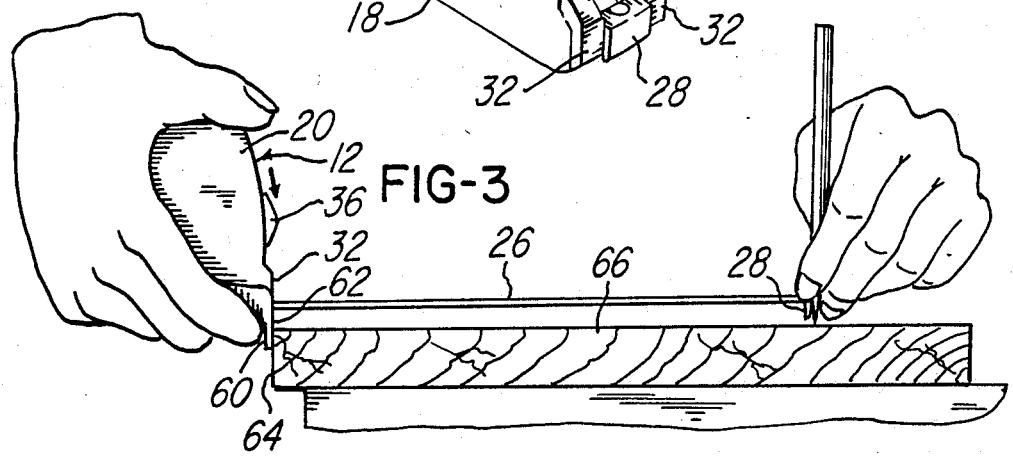
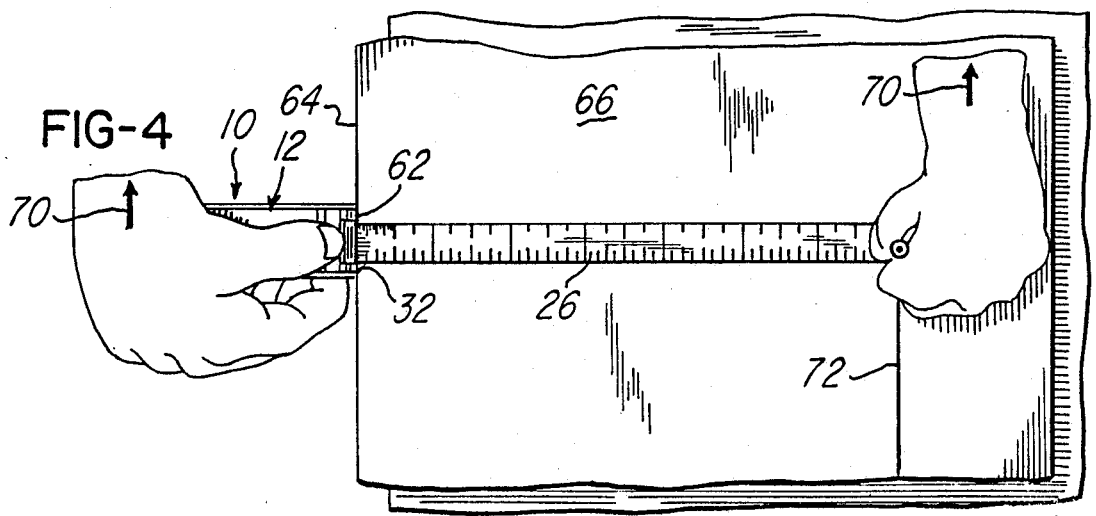

MEASURING TAPE GUIDE AND FINGER GUARD

SUMMARY OF THE INVENTION

This invention relates to a measuring tape guide and finger guard which is particularly useful for holding a measuring tape while marking a surface of a workpiece a selected distance from the edge of the surface.

A measuring tape of the type with which this invention is intended to be used comprises a flexible rule retractably coiled within a housing, the rule having a tip extending through an aperture adjacent the front end of the housing, which tip may be grasped in order to pull part of the tape out of the housing to make a measurement. The housing includes means such as a surface adjacent the aperture indicating a point (arbitrarily called the "sight point" herein) at which measurements are to be determined when part of the rule is retracted from the housing. The housing is sized such that the tape may conventionally be held by one hand, leaving the other hand free to manipulate the tape and hold a marker.

Tradesmen often use a measuring tape to mark the top surface of a workpiece by holding the tape in one hand with the forefinger of that hand resting on an edge of the workpiece. The other hand is used to hold a length of the measuring tape extended from the housing and a marker. To mark the workpiece, the marker is held against the surface to be marked while the hand holding the housing is moved along the workpiece, with the forefinger rubbing along the edge of the workpiece to serve as a guide. While this practice is commonplace, it is not a particularly good practice because the accuracy of the measurement depends greatly on the skill of the tradesman. Further, the finger used as a guide often suffers from cuts, punctures, or abrasions, especially when one uses this technique to measure lumber, drywall, fiberglass, or other materials having rough edge surfaces.

It has been suggested that the forefinger can be protected by the provision of a specially shaped housing that provide a depending guide and finger guard. However, for many types of measurements to be made accurately, the flexible rule must exit from the bottom front of the housing and the bottom surface of the tape housing is planar so that it can be placed flush against the workpiece surface to be measured. A permanent depending guide and finger guard would render this impossible. It has also been suggested to pivotally mount a guide and finger guard on the tape housing so that it can be rotated out of the way when it would interfere. However, such an assembly has apparently not been widely sold and is believed not to be entirely satisfactory.

An object of this invention is to provide an improved, inexpensive, rugged, lightweight, and easy to use measuring tape guide and finger guard for holding a measuring tape while marking a surface of a workpiece a selected distance from the edge of the surface.

In accordance with a preferred embodiment of this invention, the measuring tape guide and finger guard comprises a thin-walled, one-piece plastic body forming a jacket for slidably receiving the measuring tape. The jacket has a bottom wall, a pair of side walls, a rear wall, and a top wall, and is sized and shaped to snugly, but not tightly, receive the tape housing. A tape guide and finger guard plate extends downwardly from the front edge of the bottom wall. The front surface of the tape guide and finger guard plate is spaced from the rear wall of the jacket by a length substantially equal to the distance between the sight point and the rear surface of the measuring tape so that the plate is aligned with the sight point when the measuring tape is slipped in the jacket.

Because the jacket walls are thin, the assembled jacket and the measuring tape slipped therein are only slightly larger than the measuring tape alone. Accordingly, a user can conveniently hold the jacket and tape in one hand with the thumb holding the tape in the jacket and with the forefinger engaged with the backside of the tape guide and finger guard plate. The user may then slide the front surface of the tape guide and finger guard plate along an edge of a workpiece to accurately mark or measure the same with the forefinger protected from injury.

Optionally, the jacket can be affixed to the measuring tape housing by one or more screws, which may be the same screw or screws that hold parts of the measuring tape housing together.

Other objects and advantages will become apparent from the following description and the drawing.

BRIEF DESCRIPTION OF THE DRAWING

FIG. 1 is an exploded perspective view of a guide and finger guard in accordance with this invention and a measuring tape of a commercially available type.

FIG. 2 is a perspective view showing the measuring tape and the guide and finger guard of FIG. 1 assembled together.

FIGS. 3 and 4 are diagrammatic, fragmentary elevational and plan views, respectively, illustrating how the assembled measuring tape and guide and finger guard advantageously may be used for marking a workpiece.

DETAILED DESCRIPTION

Figure 5:
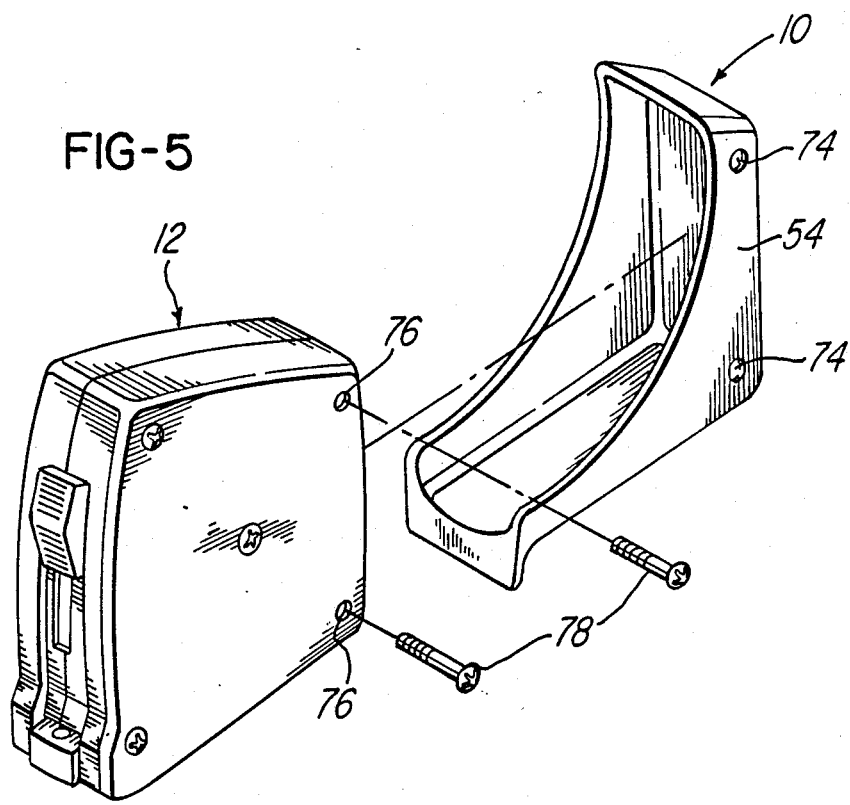
FIG. 5 is an exploded perspective view of the measuring tape and the guide and finger guard of FIG. 1 as viewed from the opposite side thereof.

With reference to the drawing, a measuring tape guide and finger guard, generally designated 10, made in accordance with this invention is intended for use with a measuring tape, generally designated 12, having a housing 14 with a top surface 16, a bottom surface 18, side surfaces 20, a front surface 22, and a rear surface 24. Measuring tape 12 further comprises a flexible rule 26 retractably coiled within the housing 14. Rule 26 has a tip 28 extending through a rule-exit aperture 30 adjacent the front end of said housing 14. One may grasp the tip 28 to pull part of the rule 26 out of the housing 14 through the rule-exit aperture 30. As is conventional, the housing 14 includes means, here consisting of forwardly facing surfaces 32 straddling the rule-exit aperture 30, indicating the sight point at which measurements along the rule 26 are to be determined. As well known, the measuring tape has spring means (not shown) for retracting the rule 26 and clamp means (not shown) controlled by a slide button 36 for maintaining the rule extended out of the housing 14. The clamping of the rule may be accomplished by sliding the button 36 downwardly as shown in FIG. 3.

The measuring tape guide and finger guard 10 comprises a one-piece body, preferably formed from plastic, having a jacket 50 for slidably receiving the measuring tape housing 14. Jacket 50 comprises a bottom wall 52, a pair of sidewalls 54 connected along the side edges of the bottom wall 52, a rear wall 56 connected to the bottom wall 52, and a top wall 58. With the exception of the top wall 58, all of the jacket walls are essentially planar. The precise contour of the jacket walls, and the adjoining edges thereof, are preferably tailored to conform to the shape of the measuring tape with which it is to be used. Accordingly, the top wall 58 is arcuate to match the arcuate contour of the top surface 16 of the tape housing 14.

In general, the jacket 50 is shaped and sized snugly, but not tightly, to receive the tape housing 14. The jacket 50 has no front wall and the forward parts of its sidewalls 54 and top wall 58 are severely recessed so that they cover only the rearmost parts of the tape housing top surface 16 and side surfaces 20. This construction leaves most of the measuring tape 12 exposed so that it can conveniently be pressed by the thumb of the user, in the manner shown in FIG. 3, securely against the inside surfaces of the jacket bottom wall 52 and rear wall 56.

The measuring tape guide and finger guard 10 also comprises a lip-like tape guide and finger guard plate 60 extending downwardly from the front edge of the jacket bottom wall 52. Plate 60 has a front surface 62 spaced from the inside surface of the jacket rear wall 56 by a length substantially equal to the distance between the forwardly facing surfaces 32 of the tape housing 14 that define the sight point and the housing rear surface 24. As a result, when the measuring tape 12 is held in the jacket 50 as shown in FIG. 3, the sight point surfaces 32 are coplanar with the front surface 62 of the tape guide and finger guard plate 60. The accuracy of measurements made in the manner shown in FIGS. 3 and 4 is thereby enhanced.

FIGS. 3 and 4 are believed self-explanatory. Briefly, the forefinger of the user's hand that holds the measuring tape 12 assembled in the guide and finger guard 10 is curled behind the guide and guard plate 62 while the plate 60 is pressed against an edge, designated 64, of a workpiece to be marked, illustrated to be a wood board 66. The user's other hand holds the rule tip 28 the desired distance away from the tape housing 14, and the user moves both hands together in the direction of the arrows 70 in FIG. 4 while continuing to press the plate 60 against the workpiece edge 64 to create a mark 72 on the top surface of the workpiece 66.

Because of its small size and thin-walled construction, the guide and guard 10 does not add substantially to the weight or bulk of the measuring tape 10 when assembled thereon. When not in use, the guide and finger guard 10 can easily be carried about in the user's pocket or tool kit.

Figure 6:
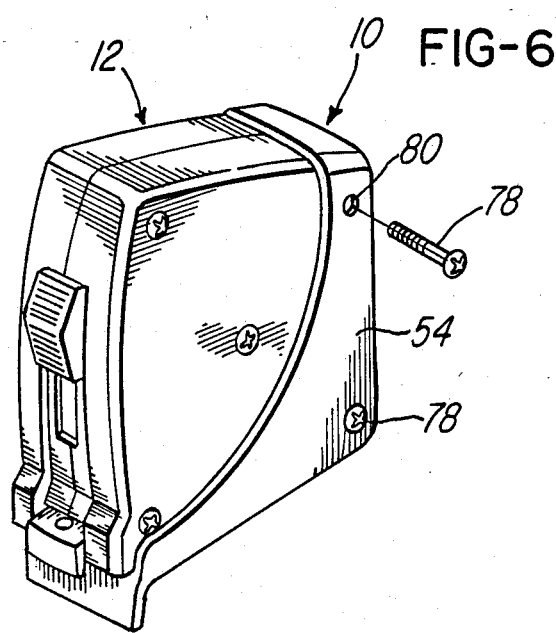
FIG. 6 is a perspective view similar to FIG. 2 but showing the measuring tape and the guide and finger guard as viewed from the opposite side thereof, and showing a part exploded away.

There may be those who would prefer that the measuring tape 12 be relatively permanently assembled in the guide and guard 10. This would be advantageous if one were, for example, intending to use the guide and guard 10 over the course of an entire day. For this purpose, with reference to FIGS. 1, 5 and 6, the guide and guard sidewalls 54 may have shallow indentations 74 adapted to be aligned with screw holes 76 in the body of the measuring tape 12 that receive screws 78. The indentations 74 are used for locating holes 80 which may be drilled or punctured in one of the sidewalls 54. As is apparent, the screws 78 may be removed and reinserted through the holes 80 formed in the indentations 74 for securing the measuring tape 12 and the guide and guard 10 to one another.

The material from which the guide and guard 10 is made is not critical. Polypropylene, polyethylene, or other suitable plastic which is relatively rigid in a thin-walled construction is preferred. Because the guard plate 62 is relatively small, it is quite stiff and provides an accurate guide for repeated use. The guide and guard 10 is preferably made by injection molding.

Although the presently preferred embodiment of this invention has been disclosed, it will be understood that within the purview of this invention various changes may be made.

I claim:

1. For use with a measuring tape having a housing with top, bottom, side, front, and rear surfaces, and a flexible rule retractably coiled within said housing, said rule having a tip extending through an aperture adjacent the front end of said housing which may be grasped in order to pull part of said tape out of said housing to make a measurement, said housing including means indicating a sight point thereon from which measurements along said rule are to be determined when part of said rule is retracted from said housing, a measuring tape guide and finger guard comprising:
a body forming a jacket for slidably receiving said measuring tape housing, said jacket comprising a bottom wall, a pair of sidewalls connected to said bottom wall, and a rear wall connected to said bottom wall; and
said body including a tape guide and finger guard plate extending downwardly from the front edge of said bottom wall, said plate having a front surface spaced from said rear wall by a length substantially equal to the distance between said sight point and said rear surface of said housing,
said body being sized to permit one to slide the front surface of said plate along an edge of a workpiece while holding said body in one hand with the forefinger of that hand curled behind said plate.

2. A measuring tape guide holder and finger guard as in claim 1 wherein said jacket and said tape guide and finger guard plate are made in one piece from plastic.

3. A measuring tape guide holder and finger guard as in claim 1 wherein said jacket and said tape guide and finger guard plate are made in one piece from thin-walled plastic.

4. A measuring tape guide holder and finger guard as in claim 1 wherein said jacket further includes a top wall, said jacket being sized to snugly receive said measuring tape.

5. For use with a measuring tape having a housing with top, bottom, side, front, and rear surfaces, and a flexible rule retractably coiled within said housing, said rule having a tip extending through an aperture adjacent the front end of said housing which may be grasped in order to pull part of said tape out of said housing to make a measurement, said housing including means indicating a sight point thereon from which measurements along said rule are to be determined when part of said rule is retracted from said housing, a measuring tape guide and finger guard comprising:
a body forming a jacket for slidably receiving said measuring tape housing, said jacket comprising a bottom wall, a pair of sidewalls connected to said bottom wall, a rear wall connected to said bottom wall, and a top wall, said top wall and said sidewalls being constructed to expose substantial portions of said measuring tape housing so that one may conveniently hold said measuring tape and said jacket in one hand to positively retain said measuring tape within said jacket while using the same; and said body including a tape guide and finger guard plate extending downwardly from the front edge of said bottom wall, said plate having a front surface spaced from said rear wall by a length substantially equal to the distance between said sight point and said rear surface of said housing, said body being sized to permit one to slide the front surface of said plate along an edge of a workpiece while holding said body in one hand with the forefinger of that hand curled behind said plate.

6. A measuring tape guide holder and finger guard as in claim 5 wherein said jacket and said tape guide and finger guard plate are made in one piece from plastic.

7. A measuring tape guide holder and finger guard as in claim 5 wherein said jacket and said tape guide and finger guard plate are made in one piece from thin-walled plastic.

8. A measuring tape guide holder and finger guard as in claim 5 wherein said jacket is sized to snugly receive said measuring tape.

9. A measuring tape guide holder and finger guard as in claim 8 wherein said jacket and said tape guide and finger guard plate are made in one piece from plastic.

10. A measuring tape guide holder and finger guard as in claim 8 wherein said jacket and said tape guide and finger guard plate are made in one piece from thin-walled plastic.

11. For use with a measuring tape having a housing with top, bottom, side, front, and rear surfaces, and a flexible rule retractably coiled within said housing, said rule having a tip extending through an aperture adjacent the front end of said housing which may be grasped in order to pull part of said tape out of said housing to make a measurement, said housing including means indicating a sight point thereon from which measurements along said rule are to be determined when part of said rule is retracted from said housing, a measuring tape guide and finger guard comprising:

a body forming a jacket for slidably receiving said measuring tape housing, said jacket comprising a bottom wall, a pair of sidewalls connected to said bottom wall, and a rear wall connected to said bottom wall; and said body including a tape guide and finger guard plate extending downwardly from the front edge of said bottom wall, said plate having a front surface spaced from said rear wall by a length substantially equal to the distance between said sight point and said rear surface of said housing, one of said sidewalls having at least one shallow depression adopted to be aligned with a screw hole in said measuring tape housing to act as a locator for forming a hole in said sidewall to permit screw connection of said tape guide holder and finger guard to said housing, and said body being sized to permit one to slide the front surface of said plate along an edge of a workpiece while holding said body in one hand with the forefinger of that hand curled behind said plate.

12. A measuring tape guide holder and finger guard as in claim 11 wherein said jacket and said tape guide and finger guard plate are made in one piece from plastic.

13. A measuring tape guide holder and finger guard as in claim 11 wherein said jacket and said tape guide and finger guard plate are made in one piece from thin-walled plastic.

14. A measuring tape guide holder and finger guard as in claim 13 wherein said jacket further includes a top wall, said jacket being sized to snugly receive said measuring tape.

* * * * *